(12) United States Patent
Sawyers-Abbott et al.

(10) Patent No.: US 10,370,111 B2
(45) Date of Patent: Aug. 6, 2019

(54) HIDDEN THRUST REVERSER BLOCKER DOOR LINK ARM FITTING

(71) Applicant: UNITED TECHNOLOGIES CORPORATION, Farmington, CT (US)

(72) Inventors: Nigel David Sawyers-Abbott, South Glastonbury, CT (US); Matthew Exner, East Hampton, CT (US)

(73) Assignee: United Technologies Corporation, Farmington, CT (US)

( * ) Notice: Subject to any disclaimer, the term of this patent is extended or adjusted under 35 U.S.C. 154(b) by 369 days.

(21) Appl. No.: 15/258,927

(22) Filed: Sep. 7, 2016

(65) Prior Publication Data
US 2018/0065754 A1    Mar. 8, 2018

(51) Int. Cl.
| | |
|---|---|
| *B64D 29/06* | (2006.01) |
| *B64D 27/16* | (2006.01) |
| *F01D 25/24* | (2006.01) |
| *F02K 1/56* | (2006.01) |
| *F02K 1/76* | (2006.01) |
| *F02K 1/72* | (2006.01) |
| *F16C 11/04* | (2006.01) |

(52) U.S. Cl.
CPC ............ *B64D 29/06* (2013.01); *B64D 27/16* (2013.01); *F01D 25/24* (2013.01); *F02K 1/56* (2013.01); *F02K 1/72* (2013.01); *F02K 1/763* (2013.01); *F16C 11/045* (2013.01); *F05D 2220/323* (2013.01); *F05D 2230/60* (2013.01); *F05D 2260/50* (2013.01); *F16C 2360/23* (2013.01); *Y02T 50/672* (2013.01)

(58) Field of Classification Search
CPC ......... B64D 29/06; B64D 27/16; F01D 25/24; F02K 1/56; F02K 1/70; F02K 1/72; F02K 1/763; F16C 1/045
See application file for complete search history.

(56) References Cited

U.S. PATENT DOCUMENTS

| 4,605,186 A | 8/1986 | Fernz |
| 5,058,828 A | 10/1991 | Pillari |
| 6,032,901 A | 3/2000 | Carimali |
| 9,714,612 B2 * | 7/2017 | Lacko ...................... F02K 1/70 |
| 2010/0270428 A1 | 10/2010 | Murphey |
| 2013/0062434 A1 | 3/2013 | Vauchel |

(Continued)

FOREIGN PATENT DOCUMENTS

| EP | 2243945 | 10/2010 |
| EP | 3156634 | 4/2017 |

OTHER PUBLICATIONS

European Patent Office, European Search Report dated Jan. 25, 2018 in Application No. 17188628.6-1007.

(Continued)

*Primary Examiner* — Justin D Seabe
*Assistant Examiner* — Sabbir Hasan
(74) *Attorney, Agent, or Firm* — Snell & Wilmer, L.L.P.

(57) ABSTRACT

A linkage system for a nacelle may comprise a pivot configured to extend through a second aperture disposed in a link arm, a base member, and a retaining member at least partially defining a first aperture and a cavity. The pivot is configured to extend at least partially into the first aperture. The cavity is configured to accommodate a portion of the link arm.

20 Claims, 14 Drawing Sheets

(56) References Cited

U.S. PATENT DOCUMENTS

2013/0219857 A1    8/2013   Zysman
2015/0308381 A1*  10/2015   Byrne ................... F02K 1/763
                                                          60/226.2
2018/0065754 A1    3/2018   Sawyers-Abbott
2018/0066607 A1    3/2018   Sawyers-Abbott et al.

OTHER PUBLICATIONS

Sawyers-Abbott, U.S. Appl. No. 15/258,820, filed Sep. 7, 2016 and entitled Hidden Thrust Reverser Blocker Door Link Arm Fitting.
U.S. Appl. No. 15/131,933, filed Apr. 18, 2016, Nigel David Sawyers-Abbott.
U.S. Appl. No. 15/131,955, filed Apr. 18, 2016, Nigel David Sawyers-Abbott.
European Patent Office, European Search Report dated Jan. 24, 2018 in Application No. 1788437.2-1007.
USPTO, Pre-Interview First Office Action dated Nov. 14, 2018 in U.S. Appl. No. 15/258,820.
USPTO, First Action Interview Office Action dated Mar. 11, 2019 in U.S. Appl. No. 15/258,820.

* cited by examiner

HIDDEN THRUST REVERSER BLOCKER DOOR LINK ARM FITTING

FIELD

This disclosure relates generally to gas turbine engines, and more particularly to thrust reverser assemblies for gas turbine engines.

BACKGROUND

Generally, a thrust reverser blocker door link arm attaches to a fan duct inner fixed structure (IFS) via a fitting attached to the surface of the IFS. The thrust reverser blocker door may rotate about the fitting to a deployed position, blocking fan duct air and causing reverse thrust. These features (i.e., the fitting and the link arm) may cause duct losses and may reduce thrust specific fuel consumption (TSFC).

SUMMARY

A linkage system for a nacelle may comprise a pivot configured to extend through a second aperture disposed in a link arm, a base member, and a retaining member at least partially defining a first aperture and a cavity, wherein the pivot is configured to extend at least partially into the first aperture, and wherein the cavity is configured to accommodate a portion of the link arm.

In various embodiments, the base member may be configured to be attached to an inner fixed structure (IFS) of the nacelle. The link arm may comprise a thrust reverser link arm. The first aperture may extend in a direction substantially orthogonal to the cavity. The retaining member may be configured to retain the link arm to the base member. The retaining member may define a first portion of the first aperture and the base member may define a second portion of the first aperture, wherein the pivot is retained within the first aperture in response to the retaining member being fastened to the base member. The retaining member may comprise an attachment aperture extending substantially orthogonal to the first aperture, the attachment aperture configured to accommodate a fastener for fastening the base member to the retaining member. The first portion may comprise a first half and the second portion comprises a second half. The cavity may comprise a high aspect ratio aperture.

A nacelle for a gas turbine engine may comprise an inner fixed structure (IFS) comprising a proximal layer and a distal layer, a link arm having a first end and a second end, wherein a second aperture is disposed in the link arm at the first end, the link arm configured to rotate about the second aperture, and a fitting arrangement for the link arm comprising a pivot extending through the second aperture, a base member attached to the proximal layer, and a retaining member at least partially defining a first aperture and a cavity, wherein the pivot is located at least partially within the first aperture, at least a portion of the pivot extends through the second aperture of the link arm, wherein the first end of the link arm is located at least partially within the cavity, and wherein the retaining member is substantially flush with the distal layer.

In various embodiments, the link arm may comprise a thrust reverser link arm. The first aperture may extend in a direction substantially orthogonal to the cavity. The retaining member may retain the link arm to the base member. A distal surface of the distal layer may at least partially define a bypass flow path. The base member may be attached to the proximal layer of the IFS via an adhesive. The retaining member may define a first portion of the first aperture and the base member may define a second portion of the first aperture, wherein the pivot is retained within the first aperture in response to the retaining member being fastened to the base member. The retaining member may comprise an attachment aperture extending substantially orthogonal to the first aperture, the attachment aperture configured to accommodate a fastener for fastening the base member to the retaining member. The base member may comprise a slot, at least a portion of the first end extending into the slot.

A method of installing a linkage system to a nacelle may comprise attaching a base member to an inner fixed structure (IFS), placing a pivot at least partially into a second aperture disposed in a link arm, placing the pivot at least partially into a first aperture disposed in a fitting arrangement, positioning the second aperture and the first aperture in concentric alignment, and attaching a retaining member to the base member, the retaining member defining at least a portion of the first aperture and defining at least a portion of a cavity, at least a portion of the link arm being located within the cavity.

In various embodiments, the method may be performed from a bypass flow path of the nacelle.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
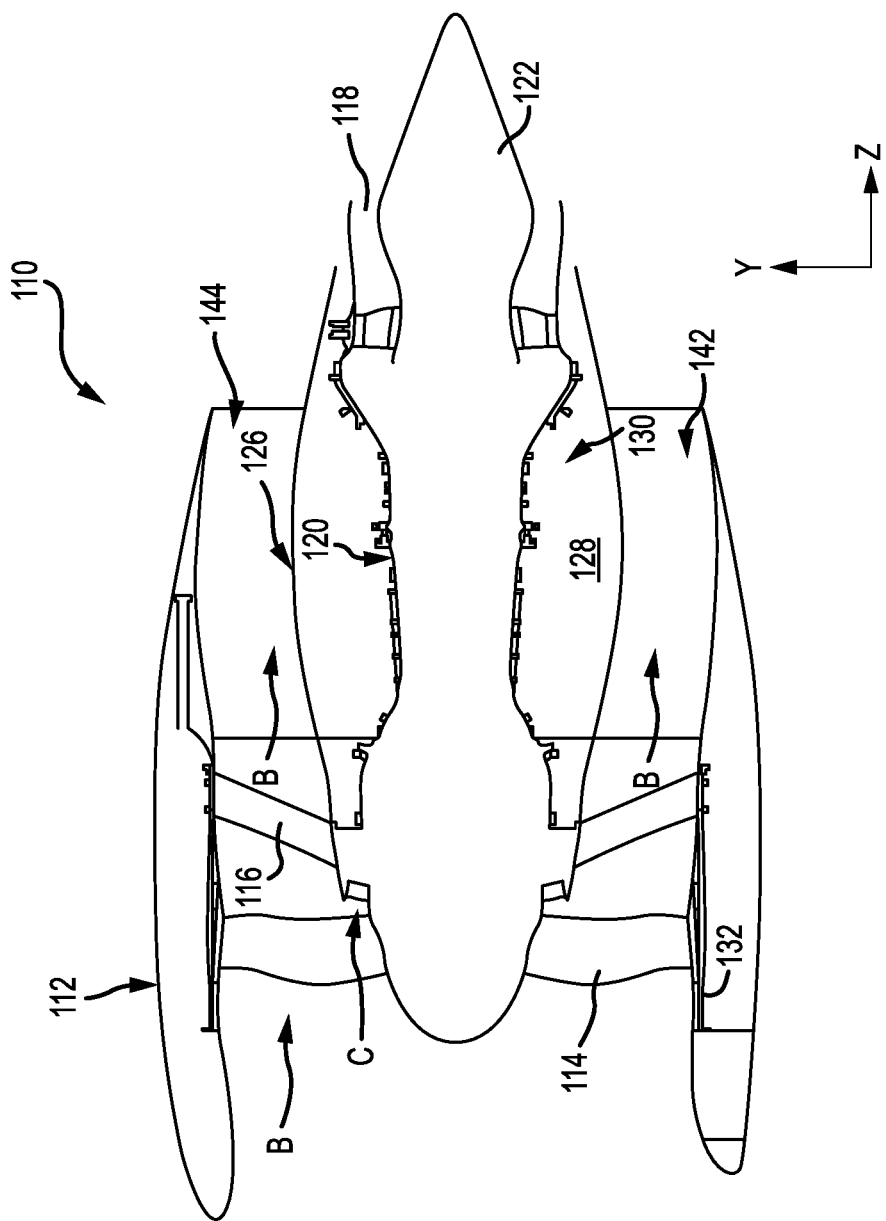
FIG. 1 illustrates a gas turbine engine, in accordance with various embodiments.

FIG. 1 illustrates a schematic view of a gas turbine engine, in accordance with various embodiments. An xyz-axis is provided for ease of illustration. Gas turbine engine 110 may include core engine 120. Core air flow C flows through core engine 120 and is expelled through exhaust outlet 118 surrounding tail cone 122.

Core engine 120 drives a fan 114 arranged in a bypass flow path B. Air in bypass flow-path B flows in the aft direction (z-direction) along bypass flow-path B. At least a portion of bypass flow path B may be defined by nacelle 112 and inner fixed structure (IFS) 126. Fan case 132 may surround fan 114. Fan case 132 may be housed within fan nacelle 112.

Nacelle 112 typically comprises two halves which are typically mounted to a pylon. According to various embodiments, multiple guide vanes 116 may extend radially between core engine 120 and fan case 132. Upper bifurcation 144 and lower bifurcation 142 may extend radially between the nacelle 112 and IFS 126 in locations opposite one another to accommodate engine components such as wires and fluids, for example.

Inner fixed structure 126 surrounds core engine 120 and provides core compartments 128. Various components may be provided in core compartment 128 such as fluid conduits and/or compressed air ducts, for example.

Figure 2A:
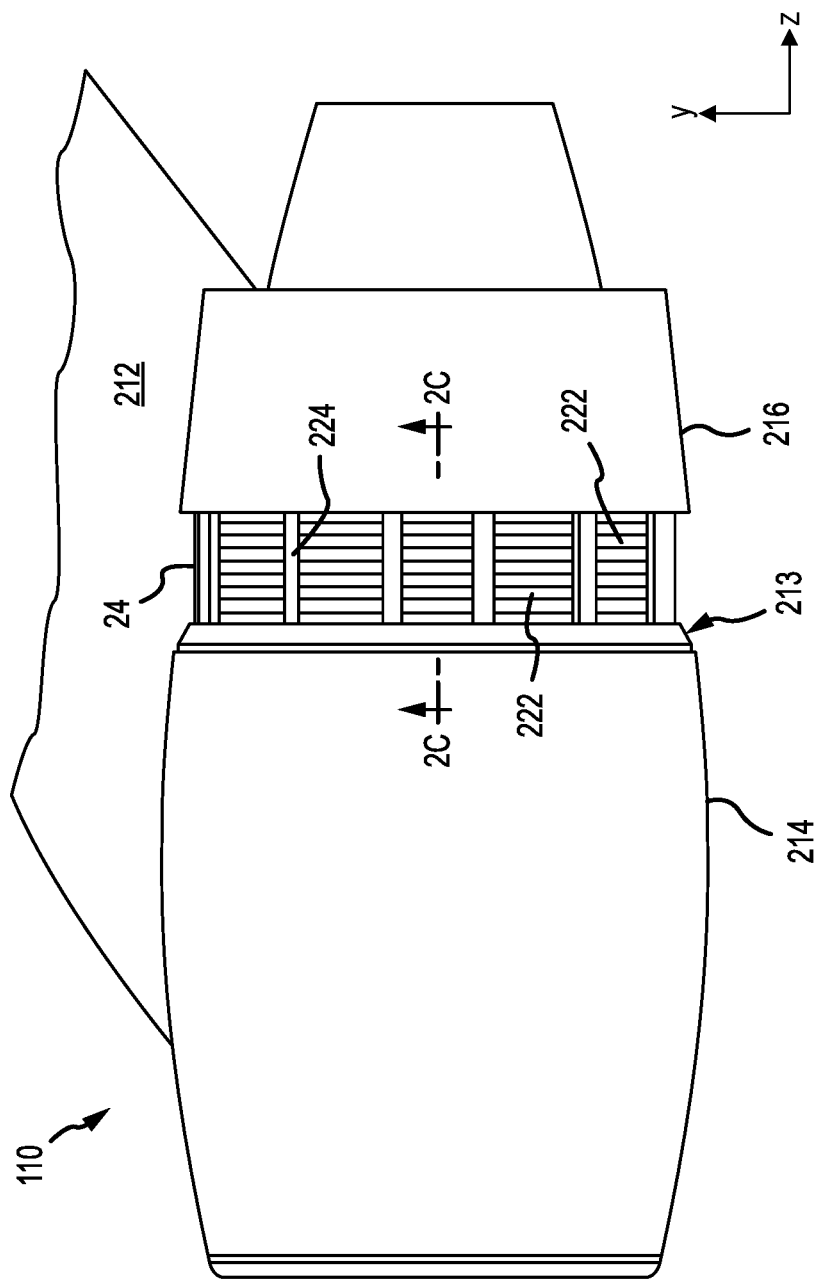
FIG. 2A illustrates a side view of a gas turbine engine, in accordance with various embodiments.

With reference to FIG. 2A, a side view of gas turbine engine 110 is illustrated, in accordance with various embodiments. Gas turbine engine 110 may comprise a turbofan engine. Gas turbine engine 110 may be mounted onto an aircraft by pylon 212. Gas turbine engine 110 may include segmented cowl 213 which includes nacelle body 214 and translating cowl 216 and IFS 126 (see FIG. 1). Translating cowl 216 is split from nacelle body 214 and translates aft to produce reverse thrust.

A plurality of cascade vane sets 222 may be uncovered in response to translating cowl 216 being translated aft as seen in FIG. 2A. Each of cascade vane sets 222 may include a plurality of conventional transverse, curved, turning vanes which turn airflow passing out from bypass flow path B (see FIG. 1) through the cascade sets in an outwardly and forwardly direction relative to gas turbine engine 110. Islands 224 are provided between cascade vane sets 222 to support the translation of translating cowl 216 and support the sides of cascade vane sets 222. In the stowed position, translating cowl 216 is translated forwardly to cover cascade vane sets 222 and provide a smooth, streamlined surface for air flow during normal flight operations.

Figure 2B:
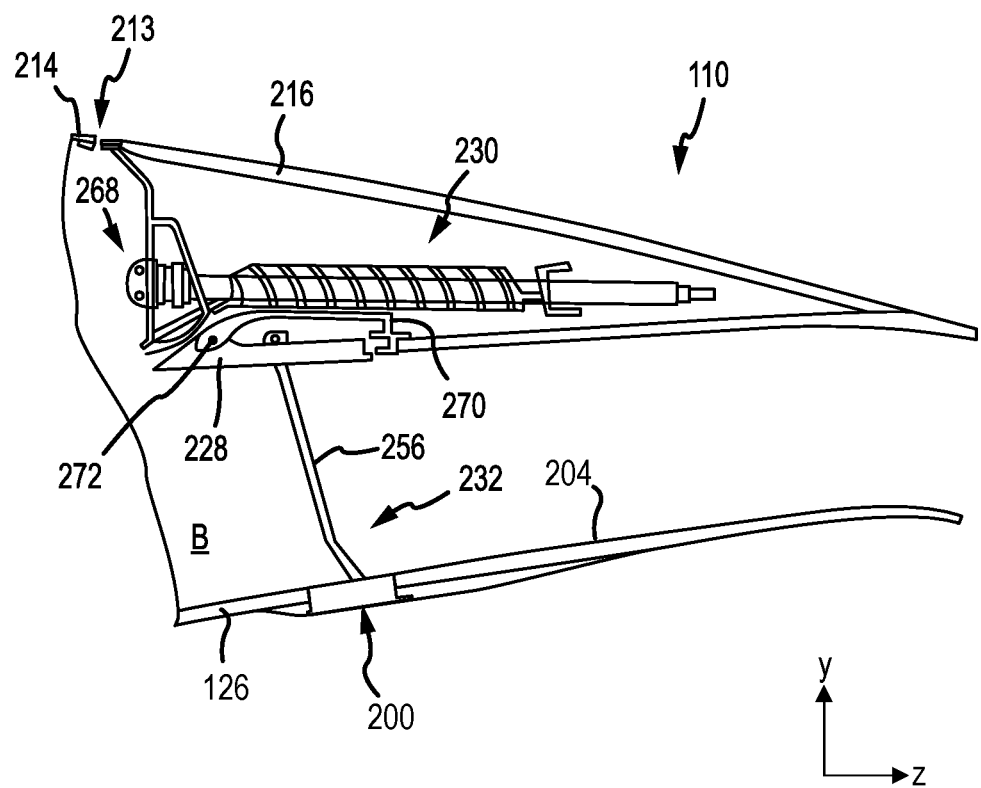
FIG. 2B illustrates a cross-section view of gas turbine engine with a blocker door in a stowed position, in accordance with various embodiments.

With reference to FIG. 2B, a cross-section view of gas turbine engine 110 with blocker door 228 in a stowed position is illustrated, in accordance with various embodiments. Cascade 230 shown in FIG. 2B is just one of many cascade vane sets 222 disposed circumferentially around gas turbine engine 110 as shown in FIG. 2A. An actuator 268 may be disposed between these sets of cascades in order to drive translating cowl 216 in the aft direction. After a thrust reversing operation is completed, actuators 268 may return blocker door 228 to the stowed position. Actuator 268 can be a ball-screw actuator, hydraulic actuator, or any other actuator known in the art. In various embodiments, multiple actuators 268 are spaced around gas turbine engine 110 in between cascade vane sets 222. Although illustrated in FIG. 2B and FIG. 2C as being radially in-line with cascade 230, actuator 268 may be located radially inward, radially outward, or in any location relative to cascade 230.

Blocker door (also referred to herein as thrust reverser blocker door) 228 may be engaged with translating cowl 216. In various embodiments, blocker door 228 may be engaged with translating cowl 216 through bracket 270. In various embodiments, bracket 270 and translating cowl 216 may comprise a single, unitary member. Pivot 272 may be a hinge attachment between blocker door 228 and bracket 270. In various embodiments, blocker door 228 may be engaged directly to translating cowl 216 through a hinge attachment. Pivot 272 may allow blocker door 228 to rotate as translating cowl 216 moves from a stowed position to a deployed position.

Figure 2C:
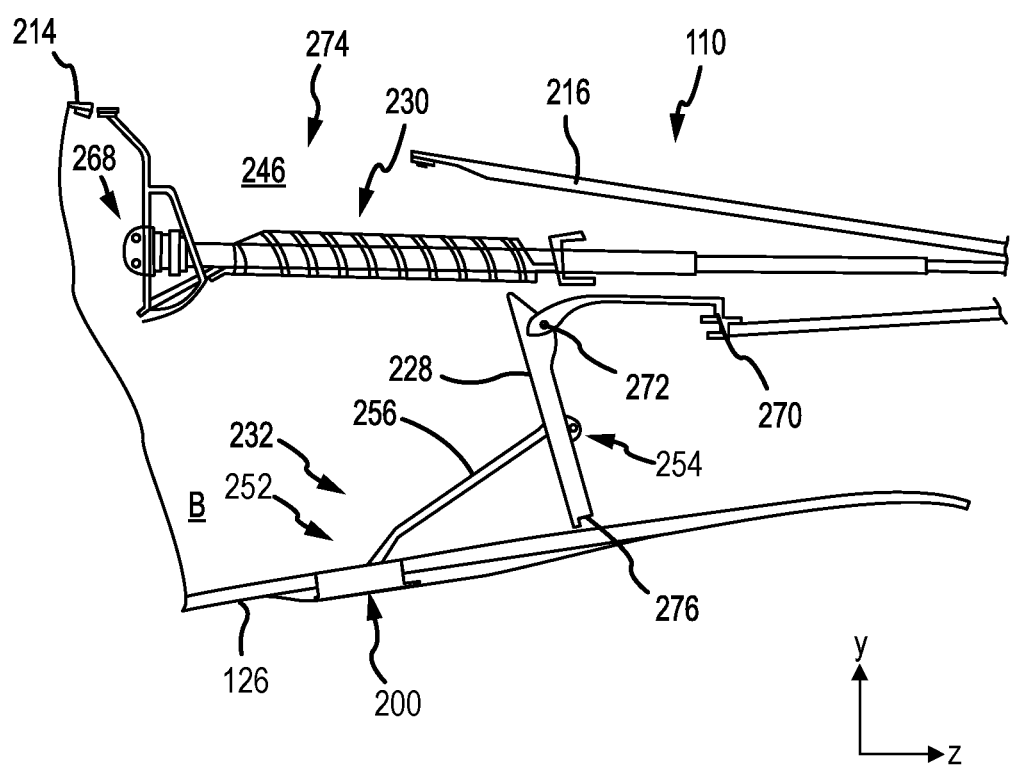
FIG. 2C illustrates a cross-section view of gas turbine engine with a blocker door in a deployed position, in accordance with various embodiments.

With combined reference to FIG. 2B and FIG. 2C, a linkage system 232 may be coupled between IFS 126 and blocker door 228. Linkage system 232 may include fitting arrangement (also referred to herein as fitting) 200 and link arm (also referred to herein as a thrust reverser link arm) 256. Fitting 200 may be coupled to IFS 126. Link arm 256 may be configured to pivot about fitting 200. Stated another way, first end 252 of link arm 256 may be rotatably coupled to fitting 200. Second end 254 of link arm 256 may be rotatably coupled to blocker door 228.

Fitting 200 may extend through an aperture disposed in IFS 126 such that fitting 200 does not extend into bypass flow-path B, allowing a more efficient flow of bypass air in bypass flow-path B. Stated another way, fitting 200 may be located such that fitting 200 does not extend radially outward of distal surface (also referred to herein as flow surface) 204 of IFS 126. Distal surface 204 may partially define bypass flow-path B. In this manner, the thrust specific fuel consumption (TSFC) of the gas turbine engine onto which fitting 200 is installed may be increased, in accordance with various embodiments.

With respect to FIG. 2C, elements with like element numbering, as depicted in FIG. 2B, are intended to be the same and will not necessarily be repeated for the sake of clarity.

With reference to FIG. 2C, a cross-section view of gas turbine engine 110 with blocker door 228 in a deployed position is illustrated, in accordance with various embodiments. Thus, FIG. 2C shows gas turbine engine 110 in a reverse thrust mode. Blocker door 228 and its associated linkage system 232 are responsive to translation of translating cowl 216 during a thrust reversing sequence. As noted above and with momentary additional reference to FIG. 1, FIG. 2B shows a normal or cruise mode where fan air is directed through bypass flow path B. When in a deployed position, shown in FIG. 2C, bypass flow path B is blocked by one or more circumferentially disposed blocker doors 228, interposed within bypass flow path B and collectively having a complementary geometric configuration with respect thereto, for diversion of fan air into bypass duct 246. The reverse thrust mode is achieved by aftward movement of translating cowl 216, thereby exposing outlet port 274 for airflow to escape through after the air passes into bypass duct 246.

Figure 2D:
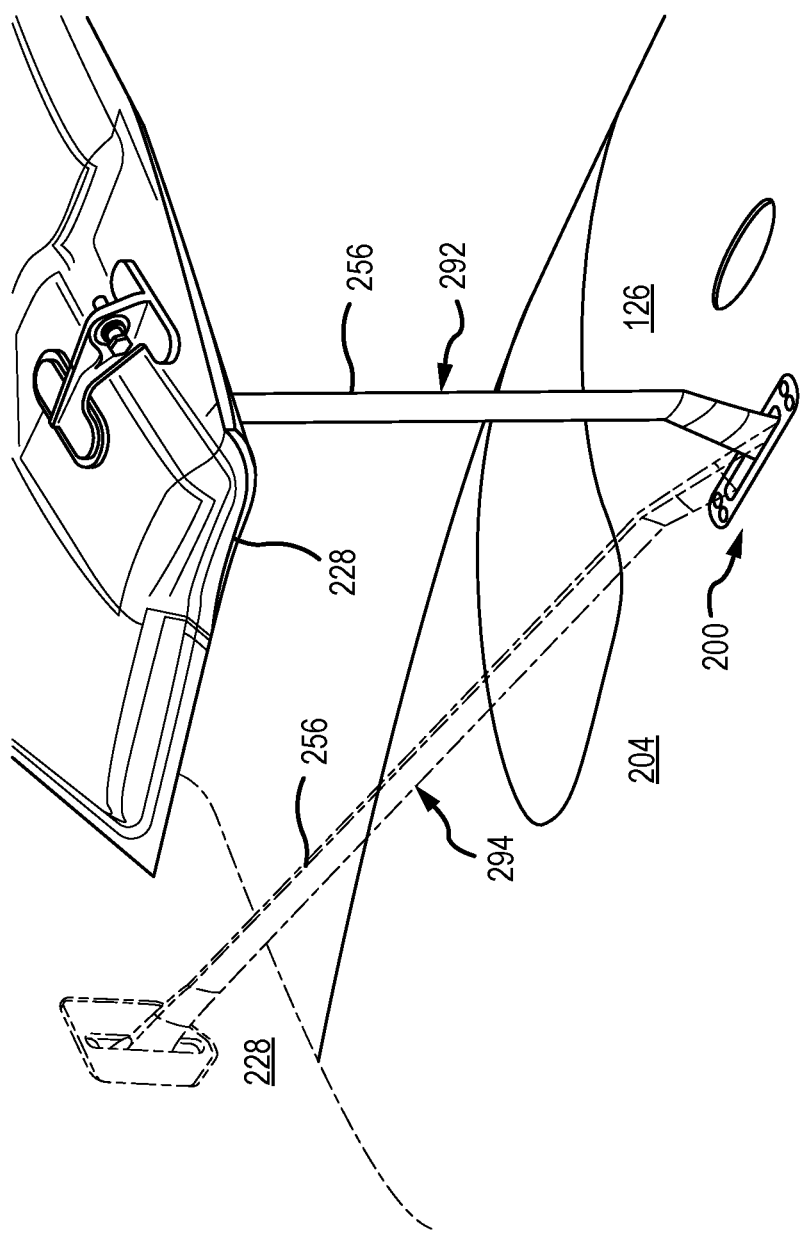
FIG. 2D illustrates a perspective view of gas turbine engine with a blocker door in both the deployed position and the stowed position, in accordance with various embodiments.

With respect to FIG. 2D, elements with like element numbering, as depicted in FIG. 2B and FIG. 2C, are intended to be the same and will not necessarily be repeated for the sake of clarity.

With reference to FIG. 2D, a perspective view of link arm 256 in the stowed position (also referred to as a normal cruise mode) 292 and the deployed position (also referred to as a reverse thrust mode) 294 is illustrated, in accordance with various embodiments. Stated another way, a perspective view of blocker door 228 in the stowed position 292 and the deployed position 294 is illustrated, in accordance with various embodiments. In various embodiments, fitting 200 may be flush with distal surface 204 when fitting 200 is in the installed position as illustrated in FIG. 2D. In various embodiments, fitting 200 may be disposed radially inward of distal surface 204 when fitting 200 is in the installed position as illustrated in FIG. 2D.

Figure 3A:
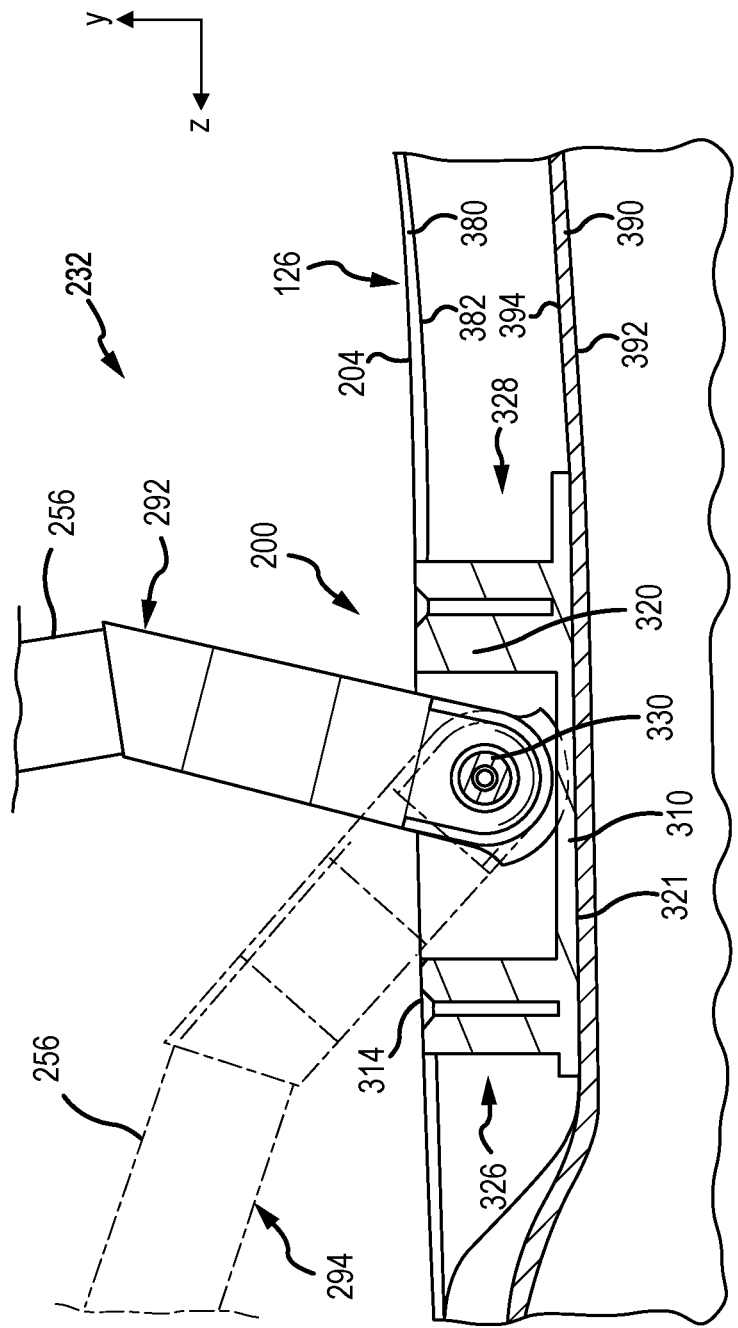
FIG. 3A illustrates a side, cross-sectional view of a fitting coupled to a link arm in both the normal cruise mode and the reverse thrust mode, in accordance with various embodiments.
Figure 3B:
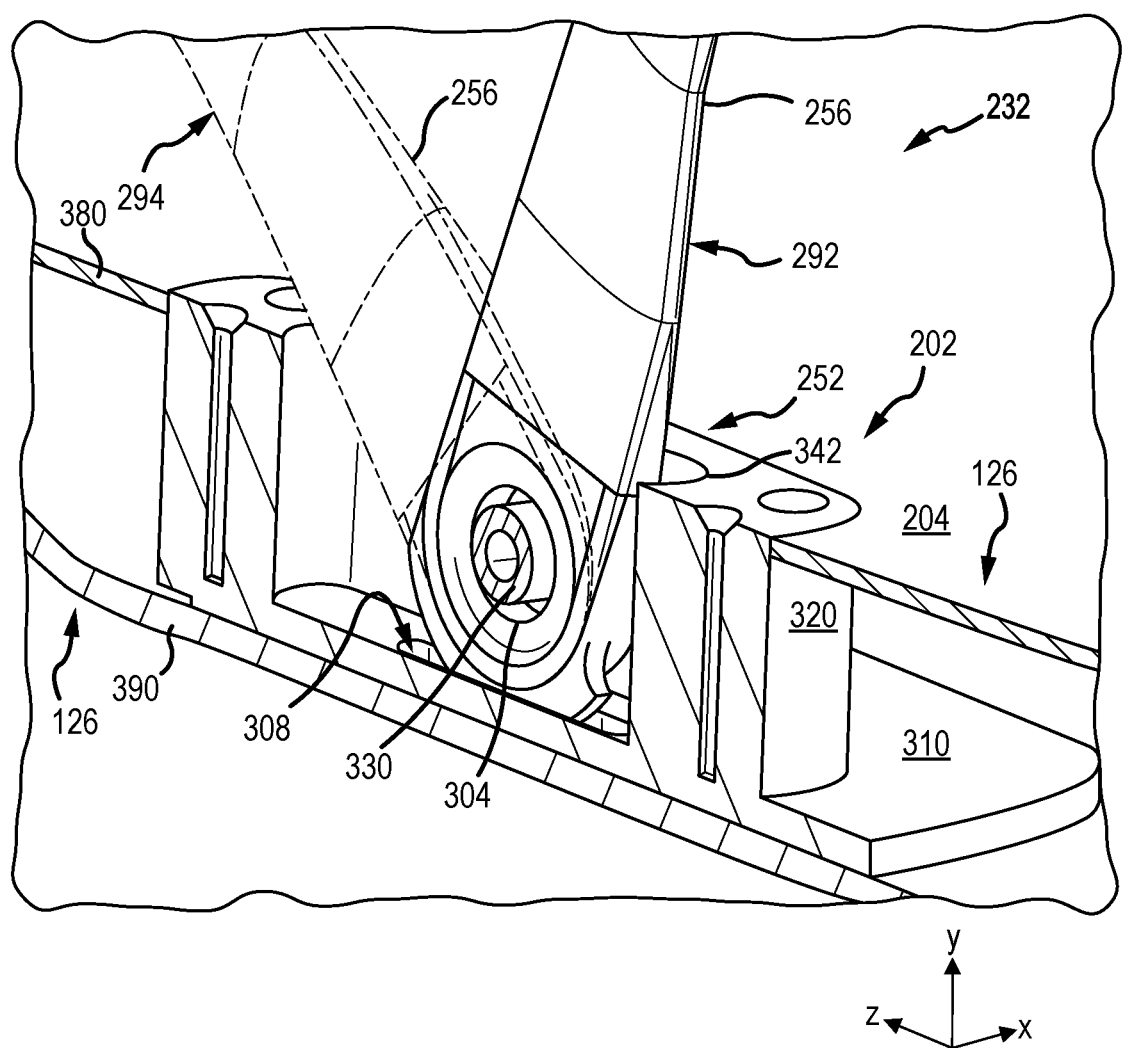
FIG. 3B, illustrates a perspective, cross-sectional view of a fitting coupled to a link arm in both the normal cruise mode and the reverse thrust mode, in accordance with various embodiments.

With respect to FIG. 3A and FIG. 3B, elements with like element numbering, as depicted in FIG. 2B and FIG. 2C, are intended to be the same and will not necessarily be repeated for the sake of clarity.

With reference to FIG. 3A, a close-up, cross-sectional view of linkage system 232 in a deployed position 294 as well as in a stowed position 292 is illustrated, in accordance with various embodiments. A yz-axes is provided for ease of illustration. Fitting 200 may be coupled to IFS 126. IFS 126 may comprise a distal layer 380 and a proximal layer 390. In various embodiments, distal layer 380 may comprise a composite sheet or may comprise a metallic sheet. In various embodiments, proximal layer 390 may comprise a composite sheet or may comprise a metallic sheet. Distal layer 380 may comprise a distal surface 204 and a proximal surface 382. Proximal layer 390 may comprise a distal surface 394 and a proximal surface 392.

In various embodiments, fitting 200 may include pivot 330, base member 310, and retaining member 320. Fitting 200 may include first end 326 and second end 328. Fitting 200 may include fastener 314. In various embodiments, fastener 314 may fasten retaining member 320 to base member 310. In various embodiments, base member 310 may be coupled to IFS 126 via an adhesive. In various embodiments, base member 310 may be coupled to IFS 126 via a fastener. In various embodiments, base member 310 may be integrally formed with IFS 126 such as during a composite co-curing process. Base member 310 may prevent retaining member 320 from moving relative to IFS 126.

With reference to FIG. 3B, a perspective, cross-section view of linkage system 232 in a deployed position 294 (also referred to as a reverse thrust mode) as well as in a stowed position 292 (also referred to as a forward thrust mode) is illustrated, in accordance with various embodiments. An xyz-axes is provided for ease of illustration. First end 252 of link arm 256 may comprise an aperture (also referred to herein as a second aperture) 304. With momentary reference to FIG. 4A, retaining member 320 may define an aperture (also referred to herein as a first aperture) 402. Pivot 330 may extend through aperture 402. Pivot 330 may be coupled to retaining member 320 via aperture 402. Pivot 330 may extend through aperture 304 of link arm 256. Link arm 256 may be pivotally coupled to retaining member 320 via pivot 330. In this regard, retaining member 320 may retain link arm 256 to base member 310. In this regard, fitting 200 may retain link arm 256 to IFS 126.

Retaining member 320 may define a cavity 342. In various embodiments, cavity 342 may comprise a high aspect ratio aperture. A high aspect ratio aperture may comprise an aperture having an aspect ratio greater than 1.5, and in various embodiments, an aspect ratio greater than 2, and in various embodiments, an aspect ratio greater than 3, wherein aspect ratio, in this regard, refers to the ratio of the width of cavity 342 (measured along the z-direction in the xz-plane) and the height of cavity 342 (measured along the x-direction in the xz-plane). First end 252 of link arm 256 may be located within cavity 342. In various embodiments, base member 310 may define a portion of cavity 342. In various embodiments, the aspect ratio of cavity 342 may be sized to accommodate rotation of link arm 256.

In various embodiments, fitting 200 may comprise a metal such as a steel alloy, stainless steel, titanium, aluminum, or any other metal. In various embodiments, fitting 200 may comprise a composite material. Pivot 330 may comprise steel or stainless steel. In various embodiments, pivot 330 may comprise aluminum. Pivot 330 may include a steel sleeve in response to pivot 330 comprising aluminum.

With reference to FIG. 3B, base member 310 may comprise a slot 308. A portion of first end 252 of link arm 256 may extend into slot 308. In various embodiments, slot 308 may comprise a high aspect ratio aperture. Slot 308 may accommodate the rotation of link arm 256. In various embodiments, slot 308 may extend entirely through base member 310. In various embodiments, slot 308 may extend through only a portion of base member 310.

With respect to FIG. 4A through FIG. 5B, elements with like element numbering, as depicted in FIG. 3A and FIG. 3B, are intended to be the same and will not necessarily be repeated for the sake of clarity.

Figure 4A:
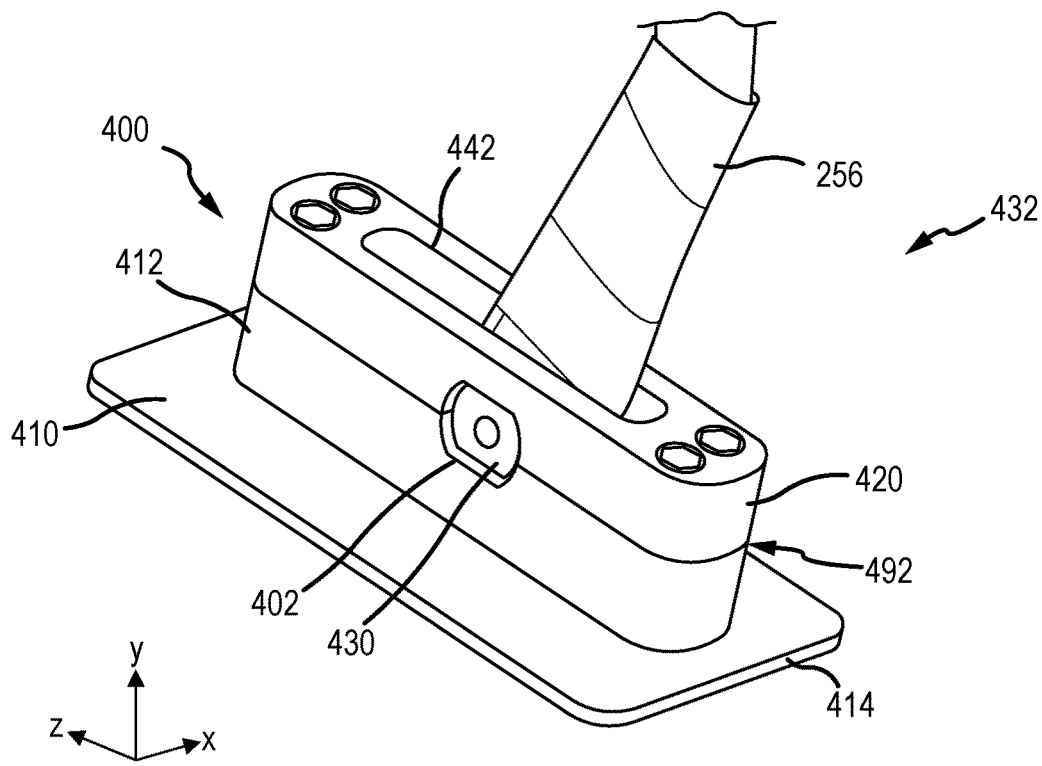
FIG. 4A illustrates a perspective view of a linkage system, in accordance with various embodiments.
Figure 4B:
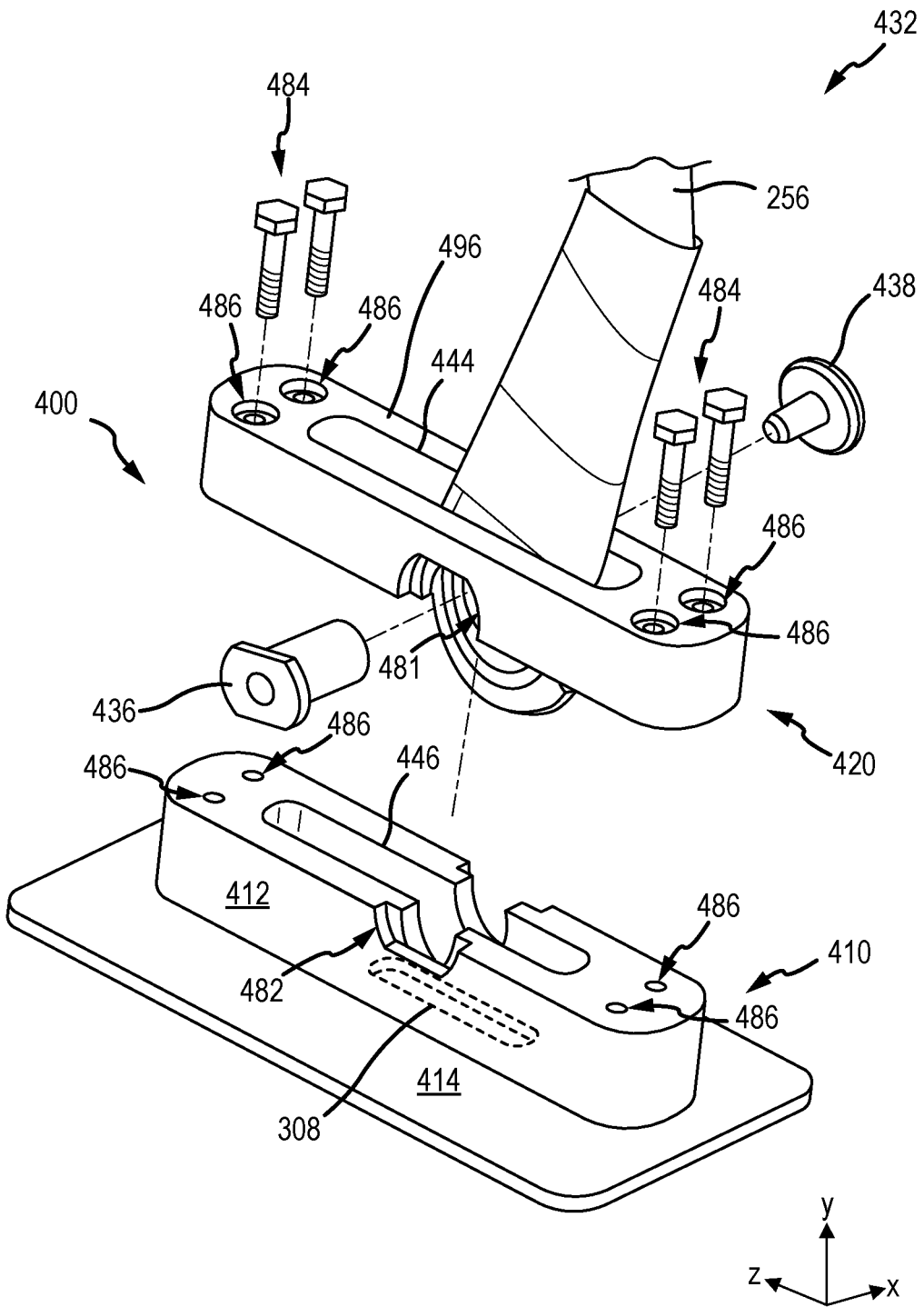
FIG. 4B illustrates an exploded view of the linkage system of FIG. 4A, in accordance with various embodiments.

With combined reference to FIG. 4A and FIG. 4B, linkage system 432 is illustrated, in accordance with various embodiments. In various embodiments, linkage system 432 may be similar to linkage system 232 (see FIG. 3A). Linkage system 432 may include fitting 400 split at location 492. Fitting 400 may include retaining member 420, base member 410, and pivot 430. Base member 410 may comprise a raised portion 412. The geometry of raised portion 412 may be complementary to the geometry of retaining member 420. Base member 410 may further comprise a plate 414. Raised portion 412 may extend from plate 414. In various embodiments, raised portion 412 may orthogonally extend from plate 414.

In various embodiments, raised portion 412 and retaining member 420 may collectively define cavity 442. Retaining member 420 may define first portion 444 of cavity 442 and base member 410 may define second portion 446 of cavity 442.

Pivot 430 may comprise a first portion 436 and a second portion 438. The first portion 436 may be threadingly coupled to the second portion 438. In various embodiments, pivot 430 may be a bearing. In various embodiments, pivot 430 may comprise a rod, pin, or the like. Although illustrated as comprising two separate pieces, it is contemplated that pivot 430 may comprise a single unitary member.

In various embodiments, pivot 430 may be compressed between retaining member 420 and base member 410. In this regard, retaining member may define a first portion 481 of aperture 402 and base member 410 may define a second portion 482 of aperture 402. A plurality of fasteners 484 may couple retaining member 420 to base member 410 via attachment apertures 486. Pivot 430 may be compressed between retaining member 420 and base member 410 in response to tightening fasteners 484. Fasteners 484 may be counter-sunk into retaining member 420 such that fasteners 484 do not extend above distal surface 496 of retaining member 420.

Figure 5A:
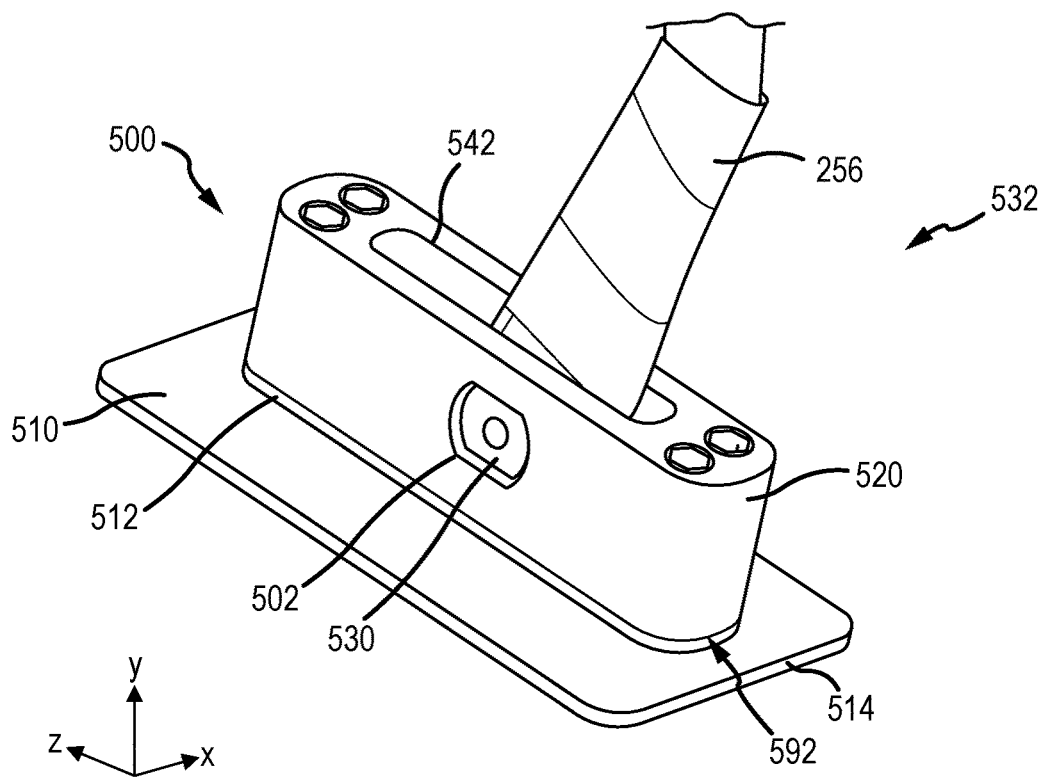
FIG. 5A illustrates a perspective view of a linkage system, in accordance with various embodiments.
Figure 5B:
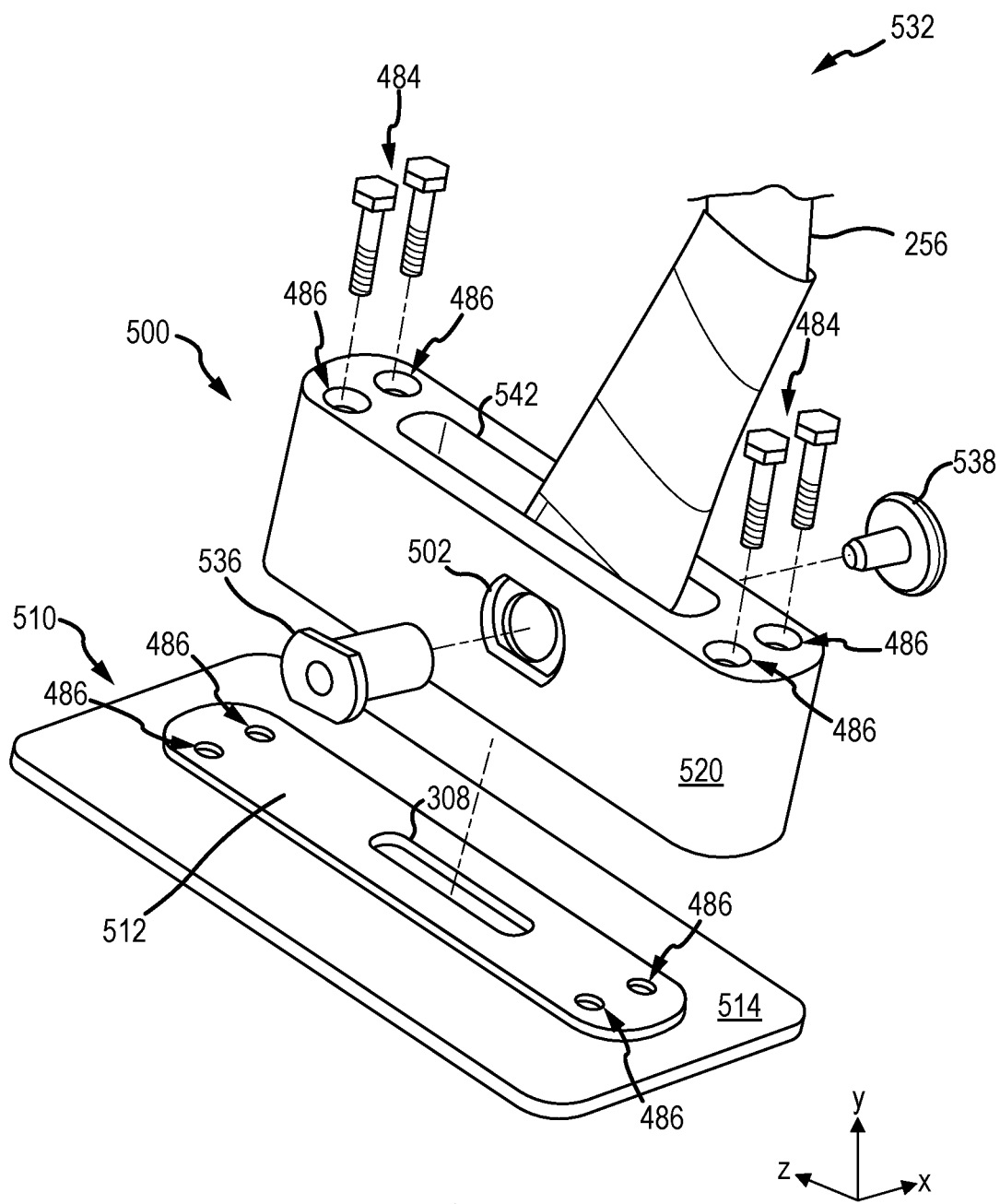
FIG. 5B illustrates an exploded view of the linkage system of FIG. 5A, in accordance with various embodiments.

With combined reference to FIG. 5A and FIG. 5B, linkage system 532 is illustrated, in accordance with various embodiments. In various embodiments, linkage system 532 may be similar to linkage system 232 (see FIG. 3A). Linkage system 532 may include fitting 500 split at location 592. Fitting 500 may include retaining member 520, base member 510, and pivot 530. Base member 510 may comprise a raised portion 512. The geometry of raised portion 512 may be complementary to the geometry of retaining member 520. Base member 510 may further comprise a plate 514. Raised portion 512 may extend from plate 514. In various embodiments, raised portion 512 may orthogonally extend from plate 514. In various embodiments, retaining member 520 may define cavity 542.

Pivot 530 may comprise a first portion 536 and a second portion 538. The first portion 536 may be threadingly coupled to the second portion 538. In various embodiments, pivot 530 may be a bearing. In various embodiments, pivot 530 may comprise a rod, pin, or the like.

Figure 6A:
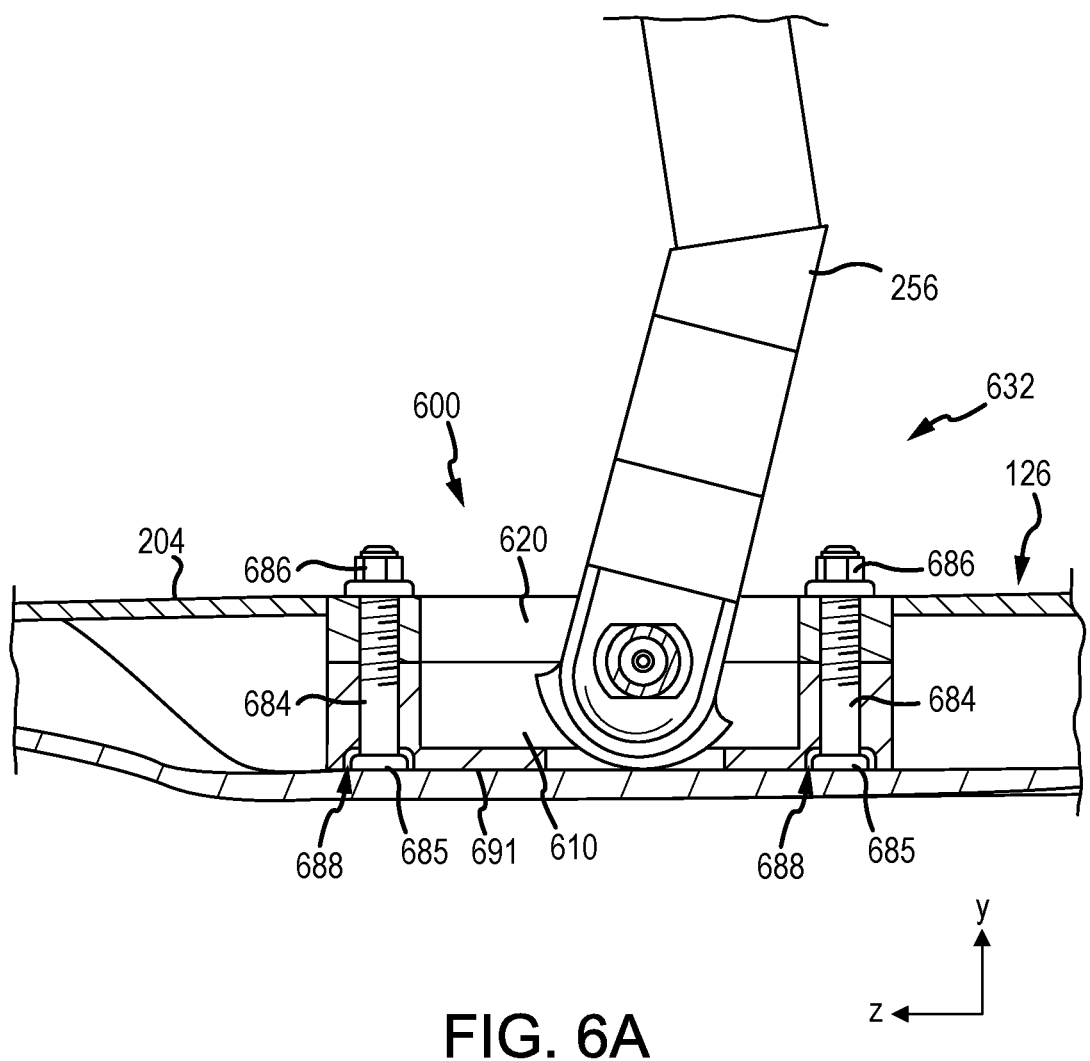
FIG. 6A illustrates a side, partial cross-section view of a linkage system, in accordance with various embodiments.
Figure 6B:
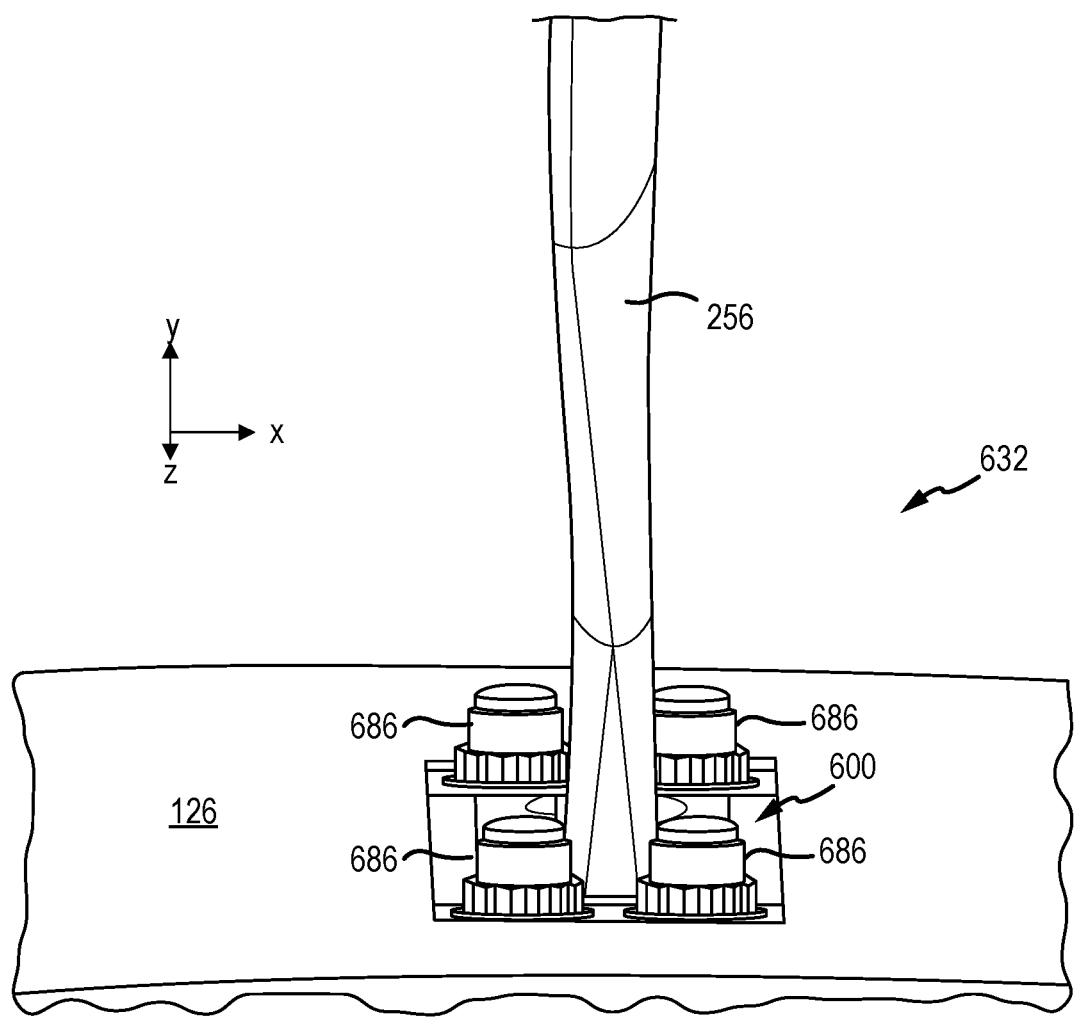
FIG. 6B illustrates an axial view of a linkage system in the installed position with fasteners circumferentially offset from the link arm, in accordance with various embodiments.

With combined reference to FIGS. 6A and 6B, a linkage system 632 is illustrated, in accordance with various embodiments. Linkage system 632 may be similar to linkage system 432 (see FIG. 4A). Linkage system 632 may include fitting 600. Fitting 600 may include retaining member 620 and base member 610. A plurality of rods 684 may extend through fitting 600. Pockets 688 may be formed into fitting 600 on proximal surface 691 of fitting 600. Pockets 688 may accommodate flanged portion 685 of rods 684. Rods 684 may comprise threaded portions. Fasteners 686 may be coupled to rods 684 to couple retaining member 620 to base member 610.

In various embodiments, fasteners 686 may be circumferentially offset (in the x-direction) from link arm 256 as illustrated in FIG. 6B. Linkage system 632 may comprise four fasteners as illustrated in FIG. 6B.

Figure 6C:
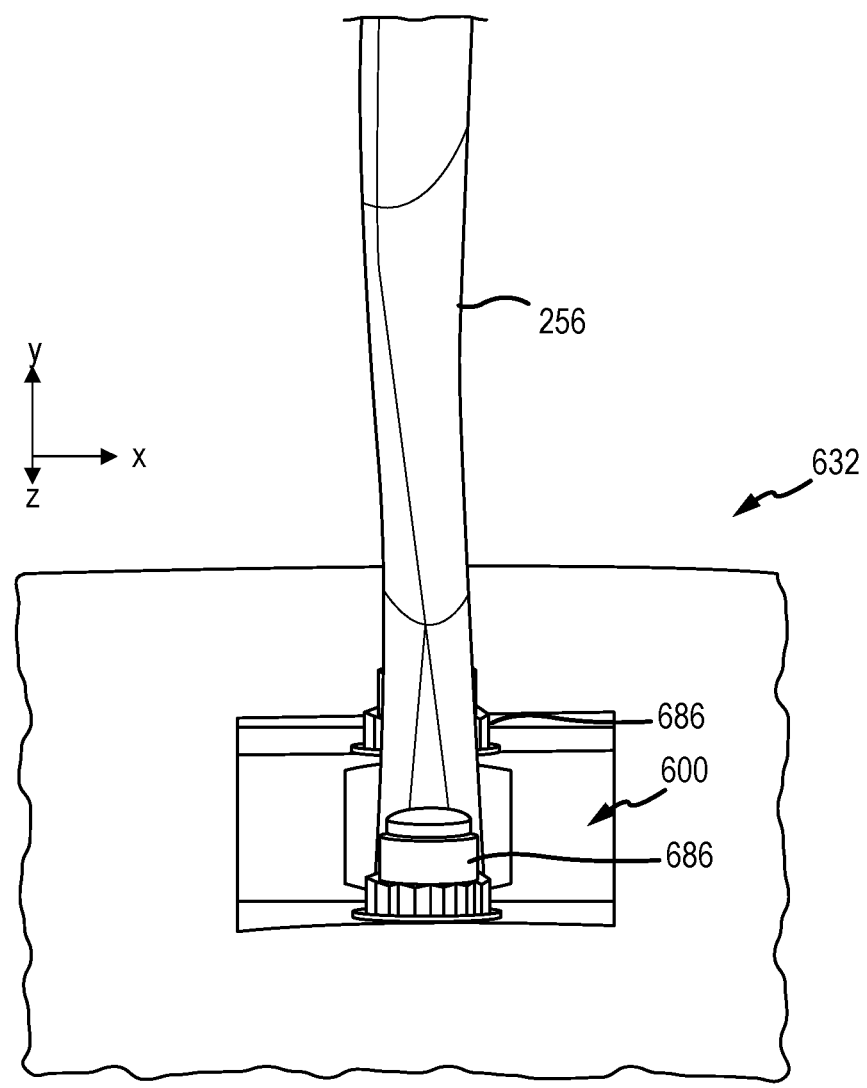
FIG. 6C illustrates an axial view of a linkage system in the installed position with fasteners axially in line with the link arm, in accordance with various embodiments.

In various embodiments, with reference to FIG. 6C, fasteners 686 may be axially in line (along the z-direction) with link arm 256 as illustrated in FIG. 6C. In this regard, linkage system 632 may comprise two fasteners as illustrated in FIG. 6C. Aligning fasteners 686 with link arm 256 may provide a more streamline linkage system 632.

Figure 7:
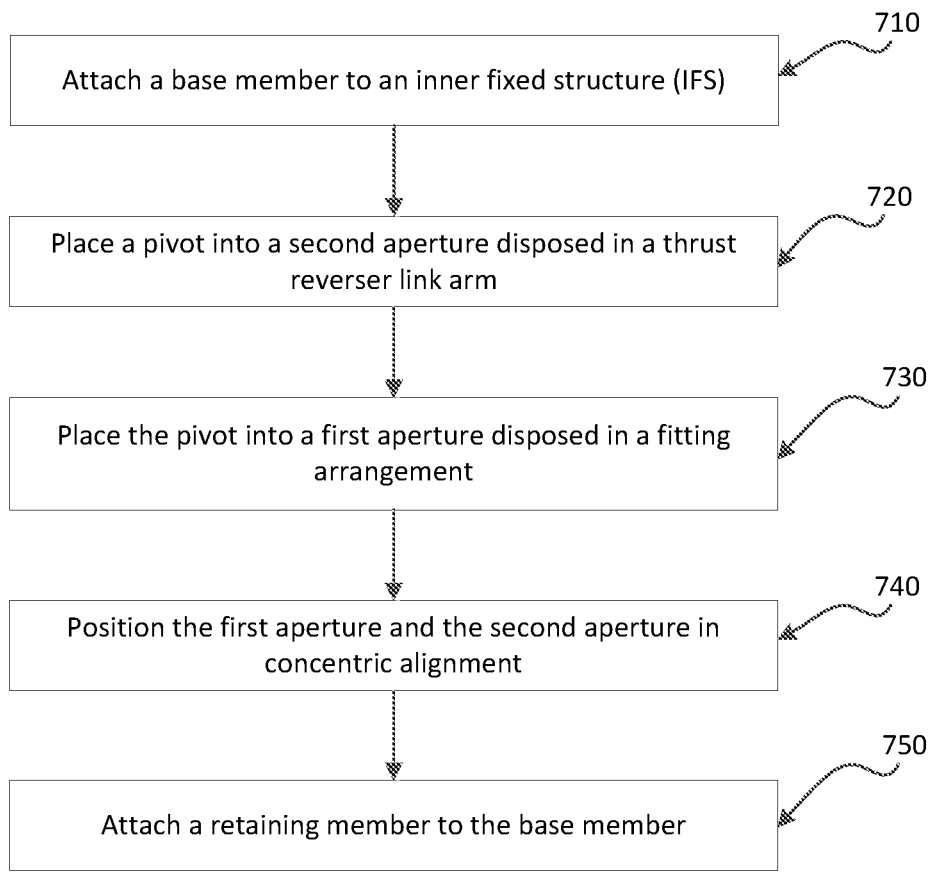
FIG. 7 illustrates a method of installing a linkage system to a nacelle, in accordance with various embodiments.

With reference to FIG. 7, a method 700 of installing a linkage system to a nacelle is provided, in accordance with various embodiments. Method 700 includes attaching a base member to an inner fixed structure (IFS) (step 710). Method 700 includes placing a pivot into a second aperture disposed in a thrust reverser link arm (step 720). Method 700 includes placing the pivot into a first aperture disposed in a fitting arrangement (step 730). Method 700 includes positioning the first aperture and a second aperture in concentric alignment (step 740). Method 700 includes attaching a retaining member to the base member (see step 550).

With combined reference to FIG. 3B, FIG. 4A, FIG. 4B, and FIG. 7, step 710 may include attaching a base member 410 to IFS 126. Step 720 may include placing pivot 430 into aperture 402 of link arm 256. Step 730 may include placing pivot 430 into aperture 304. Step 740 may include positioning aperture 402 and aperture 304 in concentric alignment. Step 750 may include attaching retaining member 420 to base member 410.

In various embodiments, method 700 may be performed without having to open the thrust reverser blocker door 228 (see FIG. 2B). In various embodiments, method 500 may be performed without having to access the core compartment 128 (see FIG. 1). In various embodiments, method 500 may be performed by accessing bypass flow path B (see FIG. 1).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A linkage system for a nacelle comprising:
a pivot configured to extend through a second aperture disposed in a link arm;
a base member; and
a retaining member at least partially defining a first aperture and a cavity,
wherein the pivot is configured to extend at least partially into the first aperture,
wherein the cavity is configured to accommodate a portion of the link arm, and
wherein the retaining member defines a first portion of the first aperture and the base member defines a second portion of the first aperture.

2. The linkage system of claim 1, wherein the base member is configured to be attached to an inner fixed structure (IFS) of the nacelle.

3. The linkage system of claim 2, wherein the link arm comprises a thrust reverser link arm.

4. The linkage system of claim 3, wherein the first aperture extends in a direction substantially orthogonal to the cavity.

5. The linkage system of claim 4, wherein the retaining member is configured to retain the link arm to the base member.

6. The linkage system of claim 1, wherein the pivot is retained within the first aperture in response to the retaining member being fastened to the base member.

7. The linkage system of claim 1, wherein the retaining member comprises an attachment aperture extending substantially orthogonal to the first aperture, the attachment aperture configured to accommodate a fastener for fastening the base member to the retaining member.

8. The linkage system of claim 1, wherein the first portion comprises a first half and the second portion comprises a second half.

9. The linkage system of claim 1, wherein the cavity comprises a high aspect ratio aperture.

10. A nacelle for a gas turbine engine comprising:
an inner fixed structure (IFS) comprising a proximal layer and a distal layer;
a link arm having a first end and a second end, wherein a second aperture is disposed in the link arm at the first end, the link arm configured to rotate about the second aperture; and
a fitting arrangement for the link arm comprising:
a pivot extending through the second aperture;
a base member attached to the proximal layer; and
a retaining member at least partially defining a first aperture and a cavity,
wherein the pivot is located at least partially within the first aperture, at least a portion of the pivot extends through the second aperture of the link arm,
wherein the first end of the link arm is located at least partially within the cavity,
wherein the retaining member is substantially flush with the distal layer, and
wherein the retaining member defines a first portion of the first aperture and the base member defines a second portion of the first aperture.

11. The nacelle of claim 10, wherein the link arm comprises a thrust reverser link arm.

12. The nacelle of claim 11, wherein the first aperture extends in a direction substantially orthogonal to the cavity.

13. The nacelle of claim 12, wherein the retaining member retains the link arm to the base member.

14. The nacelle of claim 10, wherein a distal surface of the distal layer at least partially defines a bypass flow path.

15. The nacelle of claim 14, wherein the base member is attached to the proximal layer of the IFS via an adhesive.

16. The nacelle of claim 10, wherein the pivot is retained within the first aperture in response to the retaining member being fastened to the base member.

17. The nacelle of claim 10, wherein the retaining member comprises an attachment aperture extending substantially orthogonal to the first aperture, the attachment aperture configured to accommodate a fastener for fastening the base member to the retaining member.

18. The nacelle of claim 10, wherein the base member comprises a slot, at least a portion of the first end extending into the slot.

19. A method of installing a linkage system to a nacelle comprising:
attaching a base member to an inner fixed structure (IFS);
placing a pivot at least partially into a second aperture disposed in a link arm;
placing the pivot at least partially into a first aperture disposed in a fitting arrangement;
positioning the second aperture and the first aperture in concentric alignment; and
attaching a retaining member to the base member, the retaining member defining a first portion of the first aperture and defining at least a portion of a cavity, the base member defining a second portion of the first aperture, and at least a portion of the link arm being located within the cavity.

20. The method of claim 19, wherein the method is performed from a bypass flow path of the nacelle.

* * * * *